US010097747B2

(12) United States Patent
Dayana et al.

(10) Patent No.: US 10,097,747 B2
(45) Date of Patent: Oct. 9, 2018

(54) MULTIPLE CAMERA AUTOFOCUS SYNCHRONIZATION (71) Applicant: QUALCOMM Incorporated, San Diego, CA (US)

(72) Inventors: Venkata Ravi Kiran Dayana, San Diego, CA (US); Karthikeyan Shanmugavadivelu, San Diego, CA (US); Narayana Karthik Sadanandam Ravirala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 14/919,623

(22) Filed: Oct. 21, 2015

(65) Prior Publication Data

US 2017/0118393 A1 Apr. 27, 2017

(51) Int. Cl.
H04N 5/232 (2006.01)
G06K 9/46 (2006.01)
H04N 5/265 (2006.01)
G06K 9/62 (2006.01)
H04N 5/247 (2006.01)
H04N 5/225 (2006.01)

(52) U.S. Cl.
CPC ........... H04N 5/23212 (2013.01); G06K 9/46 (2013.01); G06K 9/6201 (2013.01); H04N 5/2254 (2013.01); H04N 5/247 (2013.01); H04N 5/265 (2013.01); G06K 2009/4666 (2013.01)

(58) Field of Classification Search
CPC .. H04N 5/23212; H04N 5/2254; H04N 5/247; H04N 5/265; G06K 9/46; G06K 9/6201

USPC ......................................................... 348/349
See application file for complete search history.

(56) References Cited

U.S. PATENT DOCUMENTS 7,676,146 B2    3/2010  Border et al.
9,066,000 B2    6/2015  Kuo et al.
(Continued)

FOREIGN PATENT DOCUMENTS

WO    2017007096 A1    1/2017

OTHER PUBLICATIONS

International Search Report and Written Opinion—PCT/US2016/052933—ISA/EPO—dated Dec. 2, 2016.
(Continued)

Primary Examiner — Sinh Tran
Assistant Examiner — Zhenzhen Wu
(74) Attorney, Agent, or Firm — Toler Law Group, PC (57) ABSTRACT A method of performing an image autofocus operation using multiple cameras includes performing, at an image processor, a first autofocus operation on a first region of interest in a scene captured by a first camera and determining a second region of interest in the scene captured by a second camera. The second region of interest is determined based on the first region of interest. The method further includes performing a second autofocus operation on the second region of interest. The method also includes fusing a first image of the scene captured by the first camera with a second image of the scene captured by the second camera to generate a fused image. The first image is based on the first autofocus operation and the second image is based on the second autofocus operation.

30 Claims, 8 Drawing Sheets (56) References Cited

U.S. PATENT DOCUMENTS

| | | | |
|---|---|---|---|
| 2007/0237398 A1* | 10/2007 | Chang | G06K 9/00369 |
| | | | 382/224 |
| 2010/0097443 A1 | 4/2010 | Lablans | |
| 2011/0169918 A1* | 7/2011 | Yoo | H04N 13/0239 |
| | | | 348/46 |
| 2012/0105579 A1 | 5/2012 | Jeon et al. | |
| 2012/0140038 A1* | 6/2012 | Bi | H04N 13/271 |
| | | | 348/46 |
| 2013/0162777 A1 | 6/2013 | Wu et al. | |
| 2013/0307938 A1 | 11/2013 | Kim et al. | |
| 2014/0125760 A1 | 5/2014 | Au et al. | |
| 2014/0160245 A1* | 6/2014 | Cheng | H04N 13/0239 |
| | | | 348/47 |
| 2014/0340561 A1 | 11/2014 | Getman | |
| 2015/0130799 A1* | 5/2015 | Holzer | G06F 3/04842 |
| | | | 345/420 |
| 2016/0182821 A1* | 6/2016 | Shabtay | H04N 5/2258 |
| | | | 348/239 |
| 2016/0309095 A1* | 10/2016 | Laroia | H04N 5/247 |
| 2017/0011525 A1* | 1/2017 | Kim | H04N 5/23212 |
| 2017/0126959 A1* | 5/2017 | Shabtay | H04N 5/23212 |

OTHER PUBLICATIONS

Leutenegger S., et al., "Image Keypoint Detection, Description, and Matching", ETH Zurich, Jul. 5, 2012 (Jul. 5, 2012), pp. 1-27 Retrieved from the Internet: URL: http://www.roboticsschool.ethz.ch/airobots/programme/presentations/ImageKeypoints.pdf [retrieved on Nov. 25, 2016].

* cited by examiner

MULTIPLE CAMERA AUTOFOCUS SYNCHRONIZATION

I. FIELD

The present disclosure is generally related to image processing.

II. DESCRIPTION OF RELATED ART

Advances in technology have resulted in smaller and more powerful computing devices. For example, a variety of portable personal computing devices, including wireless telephones such as mobile and smart phones, tablets, and laptop computers, are small, lightweight, and easily carried by users. These devices can communicate voice and data packets over wireless networks. Further, many such devices incorporate additional functionalities such as a digital still camera, a digital video camera, a digital recorder, and an audio file player. Also, such devices can process executable instructions, including software applications, such as a web browser application, that can be used to access the Internet. As such, these devices can include significant computing capabilities.

Wireless devices may include multiple cameras that capture images of a scene from different viewpoints based on the location of the cameras. For example, a first camera (having a first field of view) may capture a first image of a scene from a first viewpoint and a second camera (having a second field of view) may capture a second image of the scene from a second viewpoint. The first image and the second image may be "fused" together to generate a fused image. To generate a "high-quality" fused image, the first camera and the second camera should focus on a similar object in the scene. However, because the cameras are located at different positions of the wireless device (causing the scene to be captured from different viewpoints), it may be difficult for each camera to focus on the same region of interest (e.g., focus on the same object in the scene). For example, the first camera may focus on a first region of interest depicting a first object and the second camera may focus on a second region of interest depicting a second object. If the first object is not the same as the second object, it may be difficult to fuse the first image with the second image to generate a "high-quality" fused image.

III. SUMMARY

According to one implementation of the present disclosure, a method of performing an image autofocus operation using multiple cameras includes performing, at an image processor, a first autofocus operation on a first region of interest in a scene captured by a first camera and determining a second region of interest in the scene captured by a second camera. The second region of interest is determined based on the first region of interest. The method further includes performing a second autofocus operation on the second region of interest. The method also includes fusing a first image of the scene captured by the first camera with a second image of the scene captured by the second camera to generate a fused image. The first image is based on the first autofocus operation and the second image is based on the second autofocus operation.

According to another implementation of the present disclosure, an apparatus includes an image processor and a memory storing instructions that are executable by the image processor to perform operations. The operations include performing a first autofocus operation on a first region of interest in a scene captured by a first camera and determining a second region of interest in the scene captured by a second camera. The second region of interest is determined based on the first region of interest. The operations further include performing a second autofocus operation on the second region of interest. The operations also include fusing a first image of the scene captured by the first camera with a second image of the scene captured by the second camera to generate a fused image. The first image is based on the first autofocus operation and the second image is based on the second autofocus operation.

According to another implementation of the present disclosure, a non-transitory computer-readable medium includes instructions for performing an image autofocus operation using multiple cameras. The instructions, when executed by an image processor, cause the image processor to perform operations. The operations include performing a first autofocus operation on a first region of interest in a scene captured by a first camera and determining a second region of interest in the scene captured by a second camera. The second region of interest is determined based on the first region of interest. The operations further include performing a second autofocus operation on the second region of interest. The operations also include fusing a first image of the scene captured by the first camera with a second image of the scene captured by the second camera to generate a fused image. The first image is based on the first autofocus operation and the second image is based on the second autofocus operation.

According to another implementation of the present disclosure, an apparatus includes means for performing a first autofocus operation on a first region of interest in a scene captured by a first camera. The apparatus also includes means for determining a second region of interest in the scene captured by a second camera. The second region of interest is determined based on the first region of interest. The apparatus further includes means for performing a second autofocus operation on the second region of interest. The apparatus also includes means for fusing a first image of the scene captured by the first camera with a second image of the scene captured by the second camera to generate a fused image. The first image is based on the first autofocus operation and the second image is based on the second autofocus operation.

V. DETAILED DESCRIPTION

Figure 1A:
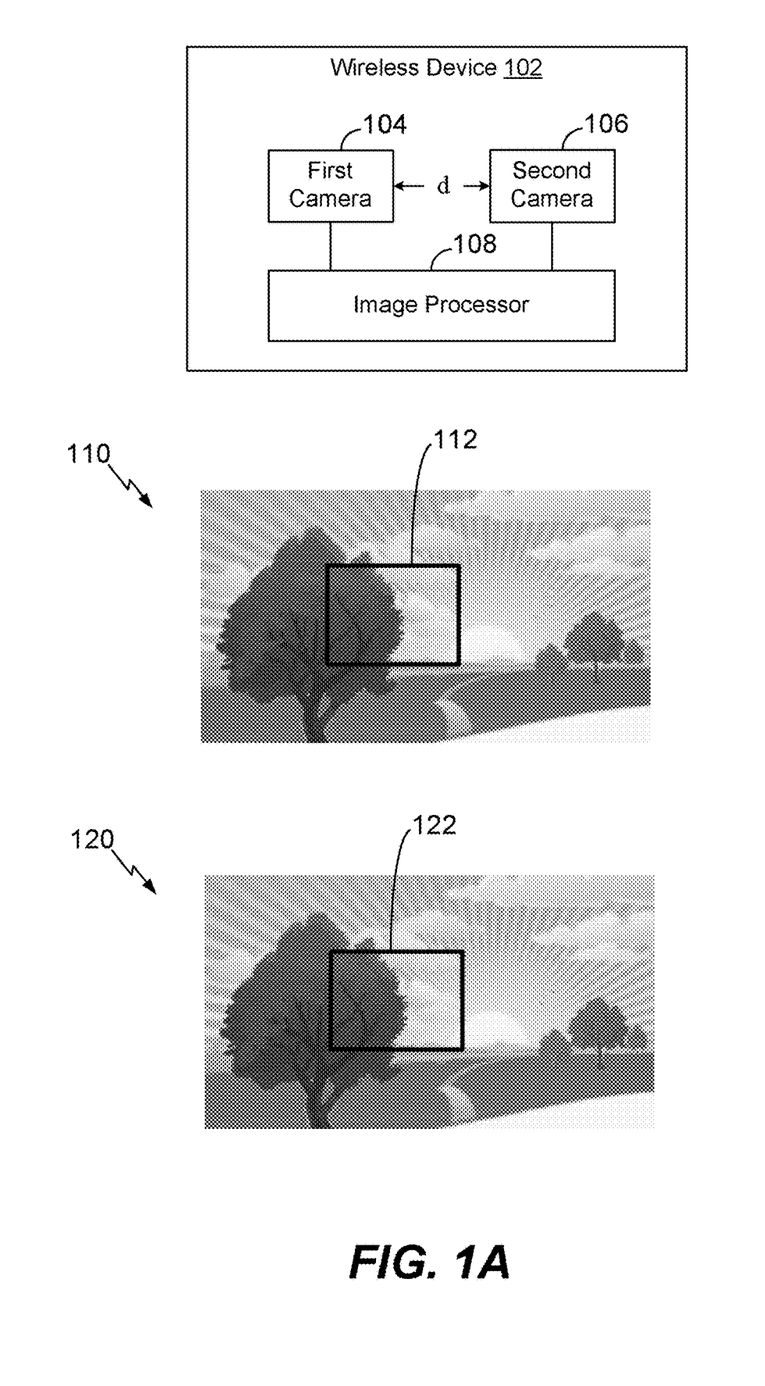
FIG. 1A illustrates a process for performing multiple camera autofocus synchronization.

Referring to FIG. 1A, a process for performing multiple camera autofocus synchronization is shown. The process depicted in FIG. 1A may be performed by an image capturing device having multiple cameras, such as a wireless device 102. The wireless device 102 may include a mobile phone, a personal digital assistant (PDA), a tablet, a navigation device, a communication device, etc.

The wireless device 102 includes a first camera 104, a second camera 106, and an image processor 108. The first camera 104 and the second camera 106 may be physically separated (on the wireless device 102) by a distance (d). As a non-limiting example, the first camera 104 may be approximately 3 centimeters (cm) away from the second camera 106 (e.g., d=3 cm). The first camera 104 may have autofocus capabilities and may capture a scene from a first field of view 110, and the second camera may have autofocus capabilities and may capture the scene from a second field of view 120.

Because the first camera 104 is located at a different location than the second camera 106, the first field of view 110 may be (slightly) different than the second field of view 120. According to the techniques described herein, the first camera 104 may capture a first image of the scene from the first field of view 110, the second camera 106 may (substantially) concurrently capture a second image of the scene from the second field of view 120, and the image processor 108 may "fuse" the first image with the second image to generate a fused image.

Prior to capturing the first image, the image processor 108 may determine a first region of interest 112 in the first field of view 110 of the first camera 104. The first region of interest 112 may focus on a particular object (e.g., a tree) in the scene. The first region of interest 112 may be selected by a user of the wireless device 102 or may be automatically designated by the image processor 108. As a non-limiting example, the image processor 108 may designate a "center" region of the first field of view 110 as the first region of interest 112. After the first region of interest 112 is determined, the first camera 104 and the image processor 108 may undergo an autofocus process. For example, a lens of the first camera 104 may move to different positions to focus on the first region of interest 112, and the first camera 104 may provide focus data (e.g., autofocus statistics) to the image processor 108 for each position of the lens. Based on the focus data, the image processor 108 may determine a first "focused" lens position for the first camera 104 that results in the first region of interest 112 in the first image having a relatively high contrast. After determining the first region of interest 112, the image processor 108 may determine a second region of interest 122 in the second field of view 120 of the second camera 106, according to the techniques described with respect to FIG. 1B.

Figure 1B:
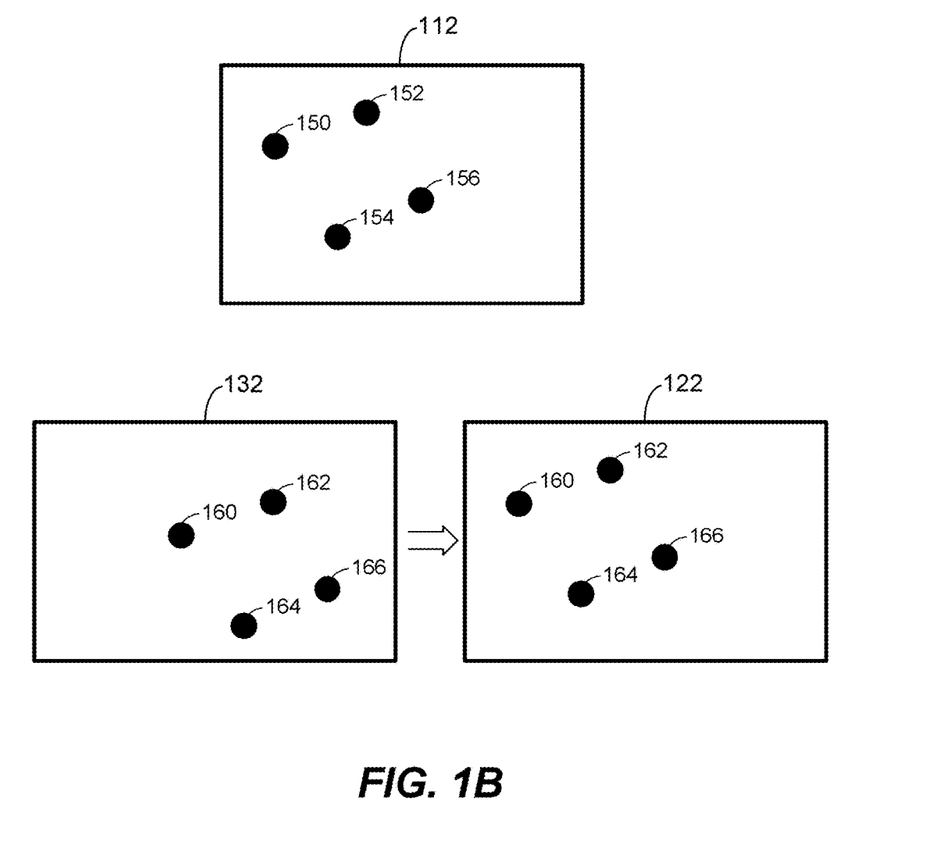
FIG. 1B illustrates a process for determining a region of interest using key-point matching.

Referring to FIG. 1B, a process for determining the second region of interest 122 using key-point matching is shown. For example, the image processor 108 may use a key-point matching algorithm to position the second region of interest 122 to capture the same object captured by the first region of interest 112. For example, the image processor 108 may identify first key-points 150, 152, 154, 156 in the first region of interest 112 and match second (corresponding) key-points 160, 162, 164, 166 in a field of view associated with the second camera 106 to the first key-points 150, 152, 154, 156 to determine the second region of interest 122. The second region of interest 122 may include the second key-points 160, 162, 164, 166. Although a key-point matching algorithm is described, other algorithms may be used in conjunction with the techniques of the present disclosure to determine the second region of interest 122.

To illustrate, the image processor 108 may be configured to identify a particular key-point of the second key-points in an initial region of interest 132 in the scene captured by the second camera 106. As a non-limiting example, the image processor 108 may identify key-point 160 in the initial region of interest 132. The image processor 108 may be configured to compare a location of key-point 160 to a location of a corresponding key-point (e.g., key-point 150) of the first key-points 150, 152, 154, 156. For example, the image processor 108 may determine that the relative location of the key-point 150 with respect to the boundaries of the first region of interest 112 is different than the relative location of the key-point 160 with respect to the boundaries of the initial region of interest 132.

Based on the comparison, the image processor 108 may be configured to modify the initial region of interest 132 to generate the second region of interest 122. For example, the image processor 108 may shift the initial region of interest 132 such that the relative location of the key-point 150 in the first region of interest 112 is substantially similar to the relative location of the key-point 160 in the shifted initial region of interest (e.g., the second region of interest 122). As another example, the image processor 108 may scale (e.g., compress or expand) the initial region of interest 132 by a scaling factor such that the relative location of the key-point 150 with respect to the boundaries of the first region of interest 112 is substantially similar to the relative location of the key-point 160 with respect to the boundaries of the second region of interest 122.

Referring back to FIG. 1A, upon determining the second region of interest 122, the second camera 106 and the image processor 108 may undergo an autofocus process. For example, a lens of the second camera 106 may move to different positions to focus on the second region of interest 122, and the second camera 106 may provide focus data to the image processor 108 for each position of the lens. Based on the focus data, the image processor 108 may determine a second "focused" lens position for the second camera 106 that results in the second region of interest 122 in the second image having a relatively high contrast.

The first camera 104 may capture the first image using the first focused lens position and the second camera 106 may (substantially concurrently) capture the second image using the second focused lens position. The image processor 108 may fuse (e.g., combine) the first image with the second image to generate the fused image.

The process described with respect to FIGS. 1A-1B may enable the first camera 104 and the second camera 106 to focus on the same object despite the distance (d) in physical location between the first camera 104 and the second camera 106. For example, by locating the same key-points in the second field of view 120 as the key-points in the first region of interest 112 to determine the second region of interest 122, the image processor 108 may enable the first camera 104 and the second camera 106 to focus on the same object. Focusing on the same object (e.g., the same region of interest) may enable the image processor 108 to fuse (e.g., blend) the first image with the second image to generate a "high-quality" fused image. For example, by focusing on the same object, there is a relatively high likelihood that the field of views 110, 120 from each camera 104, 106, respectively, are similar. Having similar field of views 110, 120 may enable the image processor 108 to relatively easily blend frames together without generating artifacts.

Figure 2:
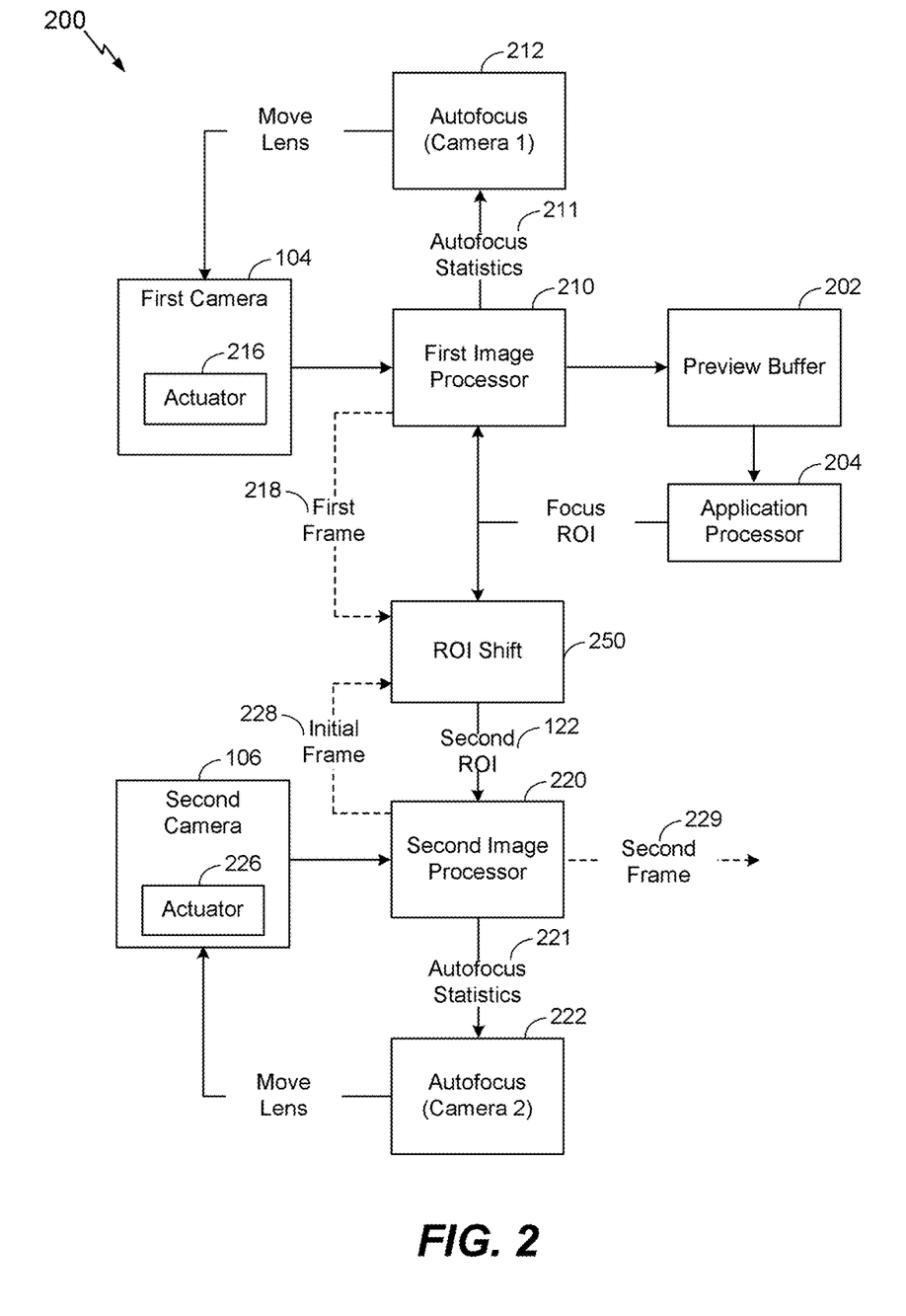
FIG. 2 illustrates a diagram that illustrates multiple camera autofocus synchronization.

Referring to FIG. 2, a diagram 200 illustrates performing multiple camera autofocus synchronization. The diagram 200 includes a preview buffer 202, an application processor 204, a first image processor 210, the first camera 104, a second image processor 220, and the second camera 106. The first camera 104 includes an actuator 216, and the second camera 106 includes an actuator 226. One or more of the components depicted in FIG. 2 may be implemented using the wireless device 102 of FIG. 1A. As a non-limiting example, the image processors 210, 220 may be included in the image processor 108 of FIG. 1A.

The preview buffer 202 may be configured to generate a preview of the scene in FIG. 1A to be captured by the first camera 104. For example, the preview buffer 202 may generate a visual representation of the first field of view 110 in FIG. 1A. The application processor 204 may be configured to focus on the first region of interest 112 in the first field of view 110. According to one implementation, the application processor 204 may designate a "center" region of the first field of view 110 as the first region of interest 112. Focusing on the center region of the first field of view 110 may be a default setting applied by the application processor 204 if other region of interest parameters have not been established. According to another implementation, the application processor 204 may designate a particular region of the first field of view 110 as the first region of interest 112 based on user input. For example, a user of the wireless device 102 may touch a user interface displaying the scene to select a particular region of the first field of view 110. In response to the user touch, the application processor 204 may designate a particular region of the first field of view 110 as the first region of interest 112. According to another implementation, the application processor 204 may designate a region displaying a face as a region of interest. For example, the application processor 204 may include facial recognition circuitry (or software) configured to detect faces (or facial features). The region including a detected face may be designated as a region of interest by the application processor 204.

Upon detecting the first region of interest 112, the first image processor 210 may generate autofocus statistics 211 based on a first position of the actuator 216. As a non-limiting example, the first image processor 210 may determine a contrast of the first region of interest 112 based on the first position of the actuator 216. After determining the autofocus statistics 211 based on the first position of the actuator 216, the first image processor 210 may perform an autofocus operation 212 to move a lens of the first camera 104 (e.g., move the actuator 216 to a second position). After moving the actuator 216 to the second position, the first image processor 210 may generate autofocus statistics 211 based on the second position of the actuator 216. The first image processor 210 may generate additional autofocus statistics 211 based on different positions of the actuator 216. After generating the autofocus statistics 211 for each position of the actuator 216, the first image processor 210 may determine (based on the collected autofocus statistics 211) a first "focused" lens position for the first camera 104 that results in the first region of interest 112 in the first image having a relatively high contrast. The first camera 104 may capture a first frame 218 while the actuator 216 is in the first focused lens position. Thus, the first frame 218 may capture the scene such that the first region of interest 112 has relatively high contrast based on the autofocus statistics 211. The first frame 218 may be used in a region of interest shift process 250 described with respect to FIG. 3.

The second image processor 220 may select the initial region of interest 132 in the scene. According to one implementation, the initial region of interest 132 may be based on a physical distance between the first camera 104 and the second camera 106. For example, the cameras 104, 106 may undergo stereo calibration such that the initial region of interest 132 is substantially similar to the first region of interest 112. The second camera 106 may capture an initial frame 228 having the initial region of interest 132, and the initial frame 228 may be used in the region of interest shift process 250.

Figure 3:
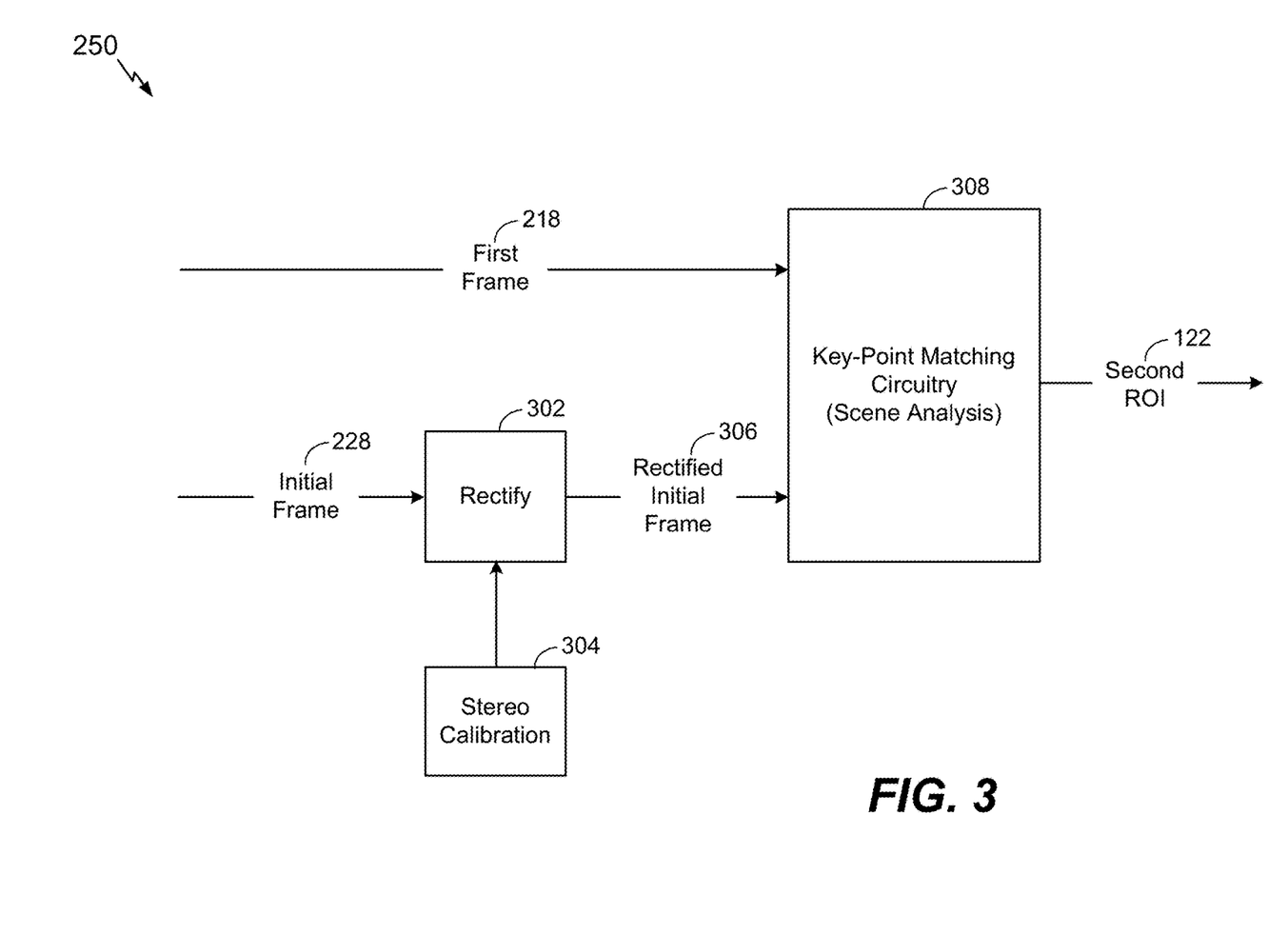
FIG. 3 illustrates a region of interest shift process.

Referring to FIG. 3, the region of interest shift process 250 is shown. The initial frame 228 captured by the second camera 106 may be provided to rectification circuitry 302. The rectification circuitry 302 may "rectify" the initial frame 228 based on stereo calibration data 304 to generate a rectified initial frame 306. As non-limiting examples, the rectification circuitry 302 may shift the scene in the initial frame 228 based on the stereo calibration data 304 or scale the scene in the initial frame 228 based on the stereo calibration data 304. The stereo calibration data 304 may be based on manufacturing settings that indicate the physical distance (d) between the first camera 104 and the second camera 106.

The first frame 218 captured by the first camera 104 and the rectified initial frame 306 may be provided to key-point matching circuitry 308. In other implementations, the initial frame 228 may be provided to the key-point matching circuitry 308 and rectification by the rectification circuitry 302 may be bypassed. The key-point matching circuitry may be configured to determine the second region of interest 122. For example, the key-point matching circuitry 308 may identify the first key-points 150, 152, 154, 156 in the first region of interest 112 and may match the first key-points 150, 152, 154, 156 to the second key-points 160, 162, 164, 166.

To illustrate, the key-point matching circuitry 308 may be configured to identify a particular key-point of the second key-points in the initial region of interest 132 (of the rectified initial frame 306) in the scene captured by the second camera 106. As a non-limiting example, the key-point matching circuitry 308 may identify key-point 160 in the initial region of interest 132 using a key-point identification algorithm. The key-point matching circuitry 308 may be configured to compare a location of key-point 160 to a location of a corresponding key-point (e.g., key-point 150) of the first key-points 150, 152, 154, 156. For example, the key-point matching circuitry 308 may determine that the relative location of the key-point 150 with respect to the boundaries of the first region of interest 112 is different than the relative location of the key-point 160 with respect to the boundaries of the initial region of interest 132.

Based on the comparison, the key-point matching circuitry 308 may be configured to modify the initial region of interest 132 to generate the second region of interest 122. For example, the key-point matching circuitry 308 may shift a location of the initial region of interest 132 such that the relative location of the key-point 150 in the first field of view 112 is substantially similar to the relative location of the key-point 160 in the shifted initial region of interest (e.g., the second region of interest 122). As another example, key-point matching circuitry 308 may scale (e.g., compress or expand) the initial region of interest 132 by a scaling factor such that the relative location of the key-point 150 in the first region of interest 112 is substantially similar to the relative location of the key-point 160 in the second region of interest 122.

Referring back to FIG. 2, the second region of interest 122 may be provided to the second image processor 220. Upon determining the second region of interest 122, the second image processor 220 may generate autofocus statistics 221 based on a first position of the actuator 226. As a non-limiting example, the second image processor 220 may determine a contrast of the second region of interest 122 based on the first position of the actuator 226. After determining the autofocus statistics 221 based on the first position of the actuator 226, the second image processor 220 may perform an autofocus operation 222 to move a lens of the second camera 106 (e.g., move the actuator 226 to a second position). After moving the actuator 226 to the second position, the second image processor 220 may generate autofocus statistics 221 based on the second position of the actuator 226. The second image processor 220 may generate additional autofocus statistics 221 based on different positions of the actuator 226. After generating the autofocus statistics 221 for each position of the actuator 226, the second image processor 220 may determine (based on the collected autofocus statistics 221) a second "focused" lens position for the second camera 106 that results in the second region of interest 122 in the second image having a relatively high contrast. The second camera 106 may capture a second frame 229 while the actuator 216 is in the second focused lens position. Thus, the second frame 229 may capture the scene such that the second region of interest 122 has relatively high contrast based on the autofocus statistics 221.

The image processors 210, 220 may fuse (e.g., combine) the first frame 218 with the second frame 229 to generate the fused image. The process described with respect to FIGS. 2-3 may enable the first camera 104 and the second camera 106 to focus on the same object despite the distance in physical location between the first camera 104 and the second camera 106. For example, by locating the same key-points in the second field of view 120 as the key-points in the first region of interest 112 to determine the second region of interest 122, the image processors 210, 220 may enable the first camera 104 and the second camera 106 to focus on the same object. Focusing on the same object (e.g., the same region of interest) may enable the image processors 210, 220 to fuse (e.g., blend) the first frame 218 with the second frame to generate a "high-quality" fused image. For example, by focusing on the same object, there is a relatively high likelihood that the field of views 110, 120 from each camera 104, 106, respectively, are similar. Having similar field of views 110, 120 may enable the image processor 210, 220 to relatively easily blend frames together without generating artifacts.

Figure 4A:
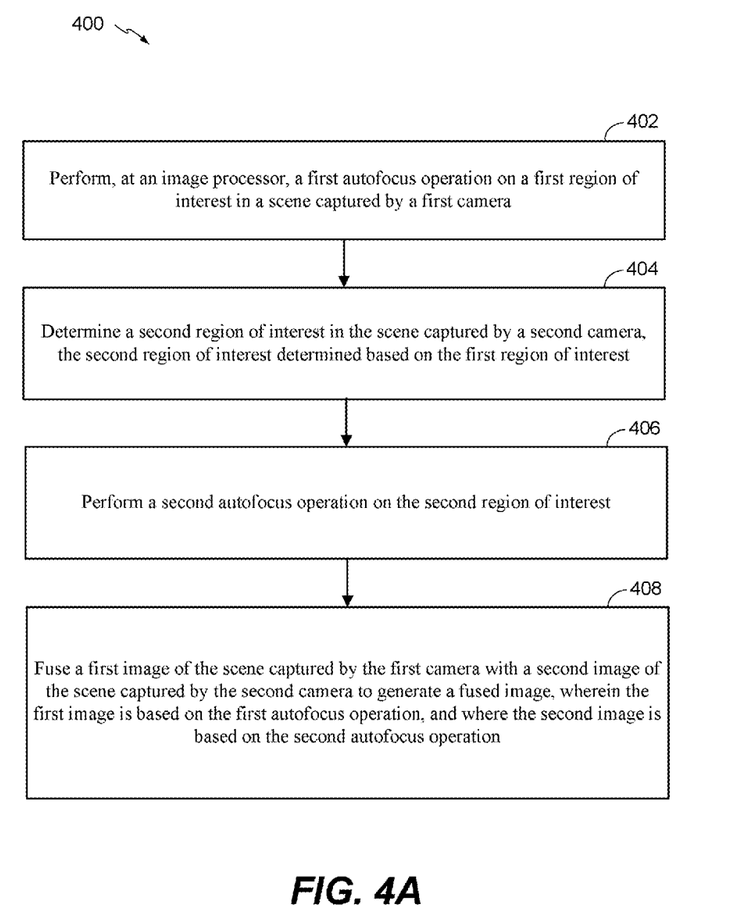
FIG. 4A illustrates a method of performing multiple camera autofocus synchronization.

Referring to FIG. 4A, a method 400 of performing multiple camera autofocus synchronization is shown. The method 400 may be performed by the wireless device 102 of FIG. 1.

The method 400 includes performing, at an image processor, a first autofocus operation on a first region of interest in a scene captured by a first camera, at 402. For example, referring to FIG. 1A, the image processor 108 may determine the first region of interest 112 in the first field of view 110 of the first camera 104. The first region of interest 112 may focus on a particular object (e.g., a tree) in the scene. After the first region of interest 112 is determined, the first camera 104 and the image processor 108 may undergo the first autofocus operation. For example, the lens of the first camera 104 may move to different positions to focus on the first region of interest 112, and the first camera 104 may provide focus data (e.g., autofocus statistics) to the image processor 108 for each position of the lens. Based on the focus data, the image processor 108 may determine the first "focused" lens position for the first camera 104 that results in the first region of interest 112 in the first image having a relatively high contrast.

According to one implementation, performing the first autofocus operation may include generating first autofocus statistics for a first lens position of the first camera and generating second autofocus statistics for a second lens position of the first camera. Performing the first autofocus operation may also include comparing the first autofocus statistics to the second autofocus statistics and moving a lens of the first camera to the first lens position or to the second lens position based on the comparison.

A second region of interest in the scene captured by the second camera may be determined, at 404. The second region of interest may be determined based on the first region of interest. For example, referring to FIG. 1B, the image processor 108 may use a key-point matching algorithm to position the second region of interest 122 to capture the same object captured by the first region of interest 112. For example, the image processor 108 may identify the first key-points 150, 152, 154, 156 in the first region of interest 112 and match second (corresponding) key-points 160, 162, 164, 166 in a field of view associated with the second camera 106 to the first key-points 150, 152, 154, 156 to determine the second region of interest 122. The second region of interest 122 may include the second key-points 160, 162, 164, 166.

A second autofocus operation may be performed on the second region of interest, at 406. For example, referring to FIG. 1A, upon determining the second region of interest 122, the second camera 106 and the image processor 108 may undergo the second autofocus operation. For example, a lens of the second camera 106 may move to different positions to focus on the second region of interest 122, and the second camera 106 may provide focus data to the image processor 108 for each position of the lens. Based on the focus data, the image processor 108 may determine a second "focused" lens position for the second camera 106 that results in the second region of interest 122 in the second image having a relatively high contrast.

According to one implementation, performing the second autofocus operation may include generating third autofocus statistics for a third lens position of the second camera and generating fourth autofocus statistics for a fourth lens position of the second camera. Performing the second autofocus operation may also include comparing the third autofocus statistics to the fourth autofocus statistics and moving a lens of the second camera to the third lens position or to the fourth lens position based on the comparison.

A first image of the scene captured by the first camera may be fused with a second image of the scene captured by the second camera to generate a fused image, at 408. The first image may be based on the first autofocus operation, and the second image may be based on the second autofocus operation. For example, referring to FIG. 1A, the first camera 104 may capture the first image using the first focused lens position and the second camera 106 may (substantially concurrently) capture the second image using the second focused lens position. The image processor 108 may fuse (e.g., combine) the first image with the second image to generate the fused image.

According to one implementation, the method 400 may include determining a first lens position (e.g., the first focused lens position) during the first autofocus operation and determining a second lens position (e.g., the second focused lens position) during the second autofocus operation. The first lens position may be used to capture the first image and the second lens position may be used to capture the second image.

According to one implementation, the method 400 may include identifying first key-points in the first region of interest. The method 400 may also include matching the first key-points to second key-points associated with a field of view of the second camera. According to one implementation, the method 400 may include identifying a particular key-point of the second key-points in an initial region of interest in the scene captured by the second camera. The method 400 may also include comparing a location of the particular key-point to a location of a corresponding key-point of the first key-points. The method 400 may further include modifying the initial region of interest based on the comparison to generate the second region of interest.

To illustrate, the image processor 108 may identify key-point 160 in the initial region of interest 132. The image processor 108 may compare a location of key-point 160 to a location of a corresponding key-point (e.g., key-point 150) of the first key-points 150, 152, 154, 156. For example, the image processor 108 may determine that the relative location of the key-point 150 in the first region of interest 112 is different than the relative location of the key-point 160 in the initial region of interest 132. Based on the comparison, the image processor 108 may modify the initial region of interest 132 to generate the second region of interest 122. For example, the image processor 108 may shift the location of the initial region of interest 132 such that the relative location of the key-point 150 in the first region of interest 112 is substantially similar to the relative location of the key-point 160 in the shifted initial region of interest (e.g., the second region of interest 122). As another example, the image processor 108 may scale (e.g., compress or expand) the initial region of interest 132 by a scaling factor such that the relative location of the key-point 150 in the first region of interest 112 is substantially similar to the relative location of the key-point 160 in the second region of interest 122.

The method 400 of FIG. 4A may enable the first camera 104 and the second camera 106 to focus on the same object despite the distance (d) in physical location between the first camera 104 and the second camera 106. For example, by locating the same key-points in the second field of view 120 as the key-points in the first region of interest 112 to determine the second region of interest 122, the image processor 108 may enable the first camera 104 and the second camera 106 to focus on the same object. Focusing on the same object (e.g., the same region of interest) may enable the image processor 108 to fuse (e.g., blend) the first image with the second image to generate a "high-quality" fused image. For example, by focusing on the same object, there is a relatively high likelihood that the field of views 110, 120 from each camera 104, 106, respectively, are similar. Having similar field of views 110, 120 may enable the image processor 108 to relatively easily blend frames together without generating artifacts.

Figure 4B:
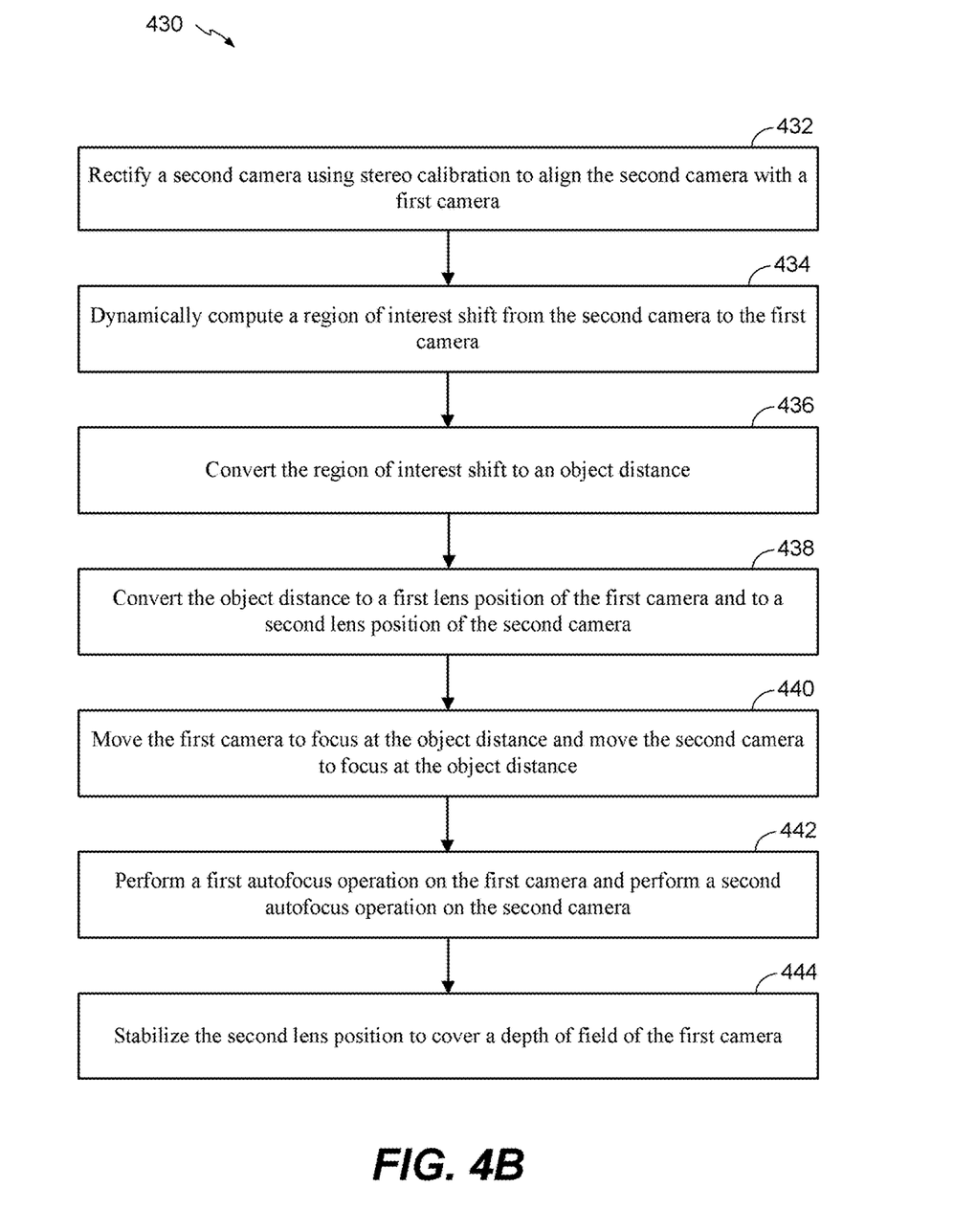
FIG. 4B illustrates another method of performing multiple camera autofocus synchronization.

Referring to FIG. 4B, another method 430 of performing multiple camera autofocus synchronization is shown. The method 430 may be performed by the wireless device 102 of FIG. 1.

The method 430 includes rectifying a second camera using stereo calibration to align the second camera with a first camera, at 432. For example, referring to FIG. 3, the rectification circuitry 302 may rectify the initial frame 228 and/or the second camera 106 based on the stereo calibration data 304 to align the second camera 106 with the first camera 104 (e.g., to align the second field of view 120 with the first field of view 110).

A region of interest shift from the second camera to the first camera may be dynamically computed, at 434. For example, referring to FIGS. 1A-1B, the image processor 108 may compute a shift between the second region of interest 122 and the first region of interest 112. The region of interest shift may be converted to an object distance, at 436. For example, referring to FIG. 1A, the image processor 108 may convert the region of interest shift to a foreground object distance, such as a distance from the wireless device 102 to the tree in the scene.

The method 430 may also include converting the object distance to a first lens position of the first camera and to a second lens position of the second camera, at 438. For example, using a lens equation, the image processor may convert the object distance to a first position of the actuator 216 of the first camera 104 and to a second position of the actuator 226 of the second camera 106. The method 430 may also include moving the first camera to focus at the object distance and moving the second camera to focus at the object distance, at 440. For example, the image processor 108 may move the first camera 104 (e.g., the actuator 216) to focus on the tree in the first region of interest 112, and the image processor 108 may move the second camera 106 (e.g., the actuator 226) to focus on the tree in the second region of interest 122.

A first autofocus operation may be performed on the first camera and a second autofocus operation may be performed on the second camera, at 442. The method 430 may also include stabilizing the second lens position to cover a depth of field (DOF) of the first camera (e.g., a reference camera), at 444.

Figure 4C:
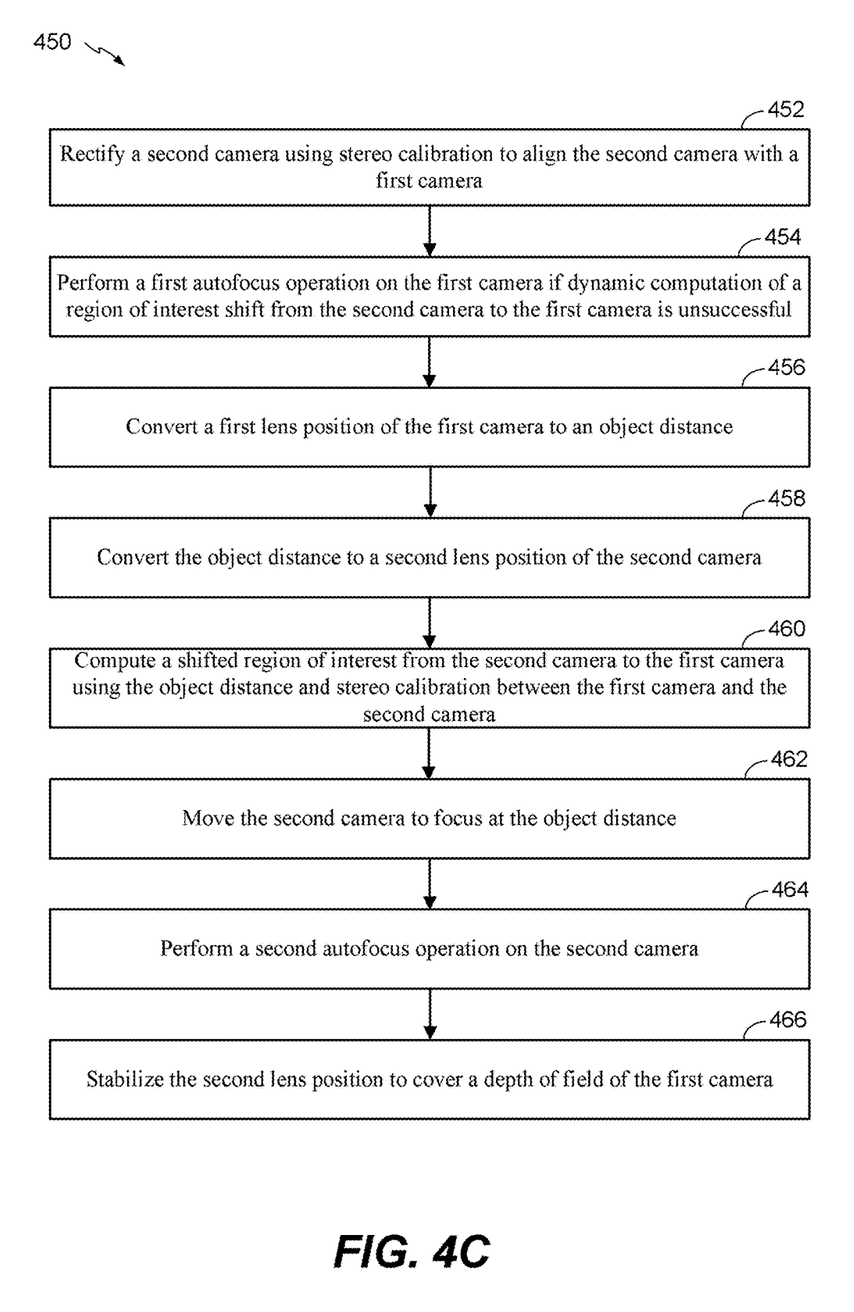
FIG. 4C illustrates another method of performing multiple camera autofocus synchronization.

Referring to FIG. 4C, another method 450 of performing multiple camera autofocus synchronization is shown. The method 450 may be performed by the wireless device 102 of FIG. 1.

The method 450 includes rectifying a second camera using stereo calibration to align the second camera with a first camera, at 452. For example, referring to FIG. 3, the rectification circuitry 302 may rectify the initial frame 228 and/or the second camera 106 based on the stereo calibration data 304 to align the second camera 106 with the first camera 104 (e.g., to align the second field of view 120 with the first field of view 110).

A first autofocus operation on the first camera may be performed if dynamic computation of a region of interest shift from the second camera to the first camera is unsuccessful, at 454. A first lens position of the first camera may be converted to an object distance, at 456.

The method 450 may also include converting the object distance to a second lens position of the second camera, at 458. A shifted region of interest from the second camera to the first camera may be computed using the object distance and stereo calibration between the first camera and the second camera, at 460.

The method 450 may also include moving the second camera to focus at the object distance, at 462. A second autofocus operation may be performed on the second camera, at 464. The second lens position may be stabilized to cover a depth of field (DOF) of the first camera (e.g., a reference camera), at 466.

Figure 5:
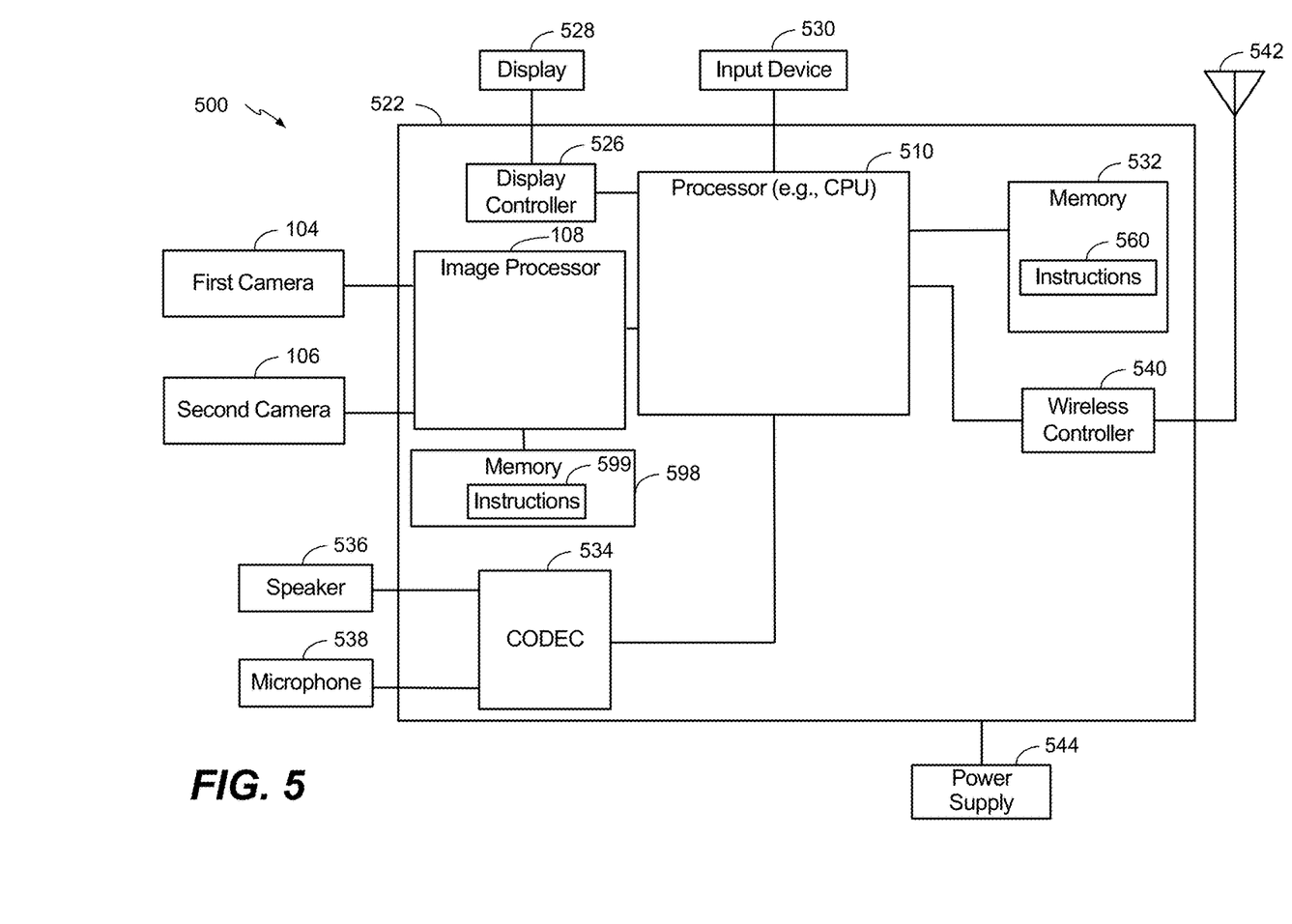
FIG. 5 illustrates an electronic device operable to perform the techniques described with respect to FIGS. 1A-4C.

Referring to FIG. 5, a block diagram of an electronic device 500 is shown. In a particular implementation, the electronic device 500 may be a wireless device. For example, the electronic device 500 may correspond to the wireless device 102 of FIG. 1. The electronic device 500 includes a processor 510 (e.g., a central processing unit (CPU)) coupled to a memory 532. The processor 108 of FIG. 1 (e.g., the image processor) is coupled to the processor 510.

The first camera 104 and the second camera 106 may be coupled to the image processor 108. The image processor 108 may determine the first region of interest 112 in the first field of view 110 of the first camera 104. After the first region of interest 112 is determined, the first camera 104 and the image processor 108 may undergo the first autofocus operation. For example, the lens of the first camera may move to different positions to focus on the first region of interest 112, and the first camera 104 may provide autofocus statistics to the image processor 108 for each position of the lens. Based on the autofocus statistics, the image processor 108 may determine the first focused lens position that results in the first region of interest 112 having relatively high contrast.

The image processor 108 may use the key-point matching algorithm described above to determine the second region of interest 122 based on the first region of interest 112. Upon determining the second region of interest 122, the second camera 106 and the image processor 108 may undergo the second autofocus operation. For example, the lens of the second camera 106 may move to different positions to focus on the second region of interest 122, and the second camera 106 may provide autofocus statistics to the image processor 108 for each position of the lens. Based on the autofocus statistics, the image processor may determine the second focused lens position that results in the second region of interest 122 having relatively high contrast. The first camera 104 may capture the first image using the first focused lens position and the second camera 106 may (substantially concurrently) capture the second image using the second focused lens position. The image processor 108 may fuse (e.g., combine) the first image with the second image to generate the fused image. A memory 598 may be coupled to the image processor 108. The memory 598 may be a non-transitory computer-readable medium that includes instructions 599 executable by the image processor 108 to perform the methods 400, 430, 450 of FIGS. 4A-4C.

The memory 532 may be also non-transitory computer-readable medium that includes instructions 560 executable by the processor 510 to perform the methods 400, 430, 450 of FIGS. 4A-4C. As used herein, a "non-transitory computer-readable medium" may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM).

FIG. 5 also shows a display controller 526 that is coupled to the processor 510 and to a display 528. A coder/decoder (CODEC) 534 is coupled to the processor 510. A speaker 536 can be coupled to the CODEC 534, and a microphone 538 can be coupled to the CODEC 534. FIG. 5 also indicates that a wireless controller 540 can be coupled to the processor 510 and to an antenna 542. In a particular implementation, the processor 510, the image processor 108, the display controller 526, the memory 532, the CODEC 534, and the wireless controller 540 are included in a system-in-package or system-on-chip device 522. In a particular implementation, an input device 530, such as a touchscreen and/or keypad, and a power supply 544 are coupled to the system-on-chip device 522. Moreover, in a particular implementation, as illustrated in FIG. 5, the display 528, the input device 530, the speaker 536, the microphone 538, the antenna 542, the power supply 544, the first camera 104, and the second camera 106 are external to the system-on-chip device 522. However, each of the display 528, the input device 530, the speaker 536, the microphone 538, the antenna 542, the power supply 544, the first camera 104, and the second camera 106 can be coupled to a component of the system-on-chip device 522, such as an interface or a controller.

In conjunction with the described implementations, an apparatus includes means for performing a first autofocus operation on a first region of interest in a scene captured by a first camera. For example, the means for performing the first autofocus operation may include the first camera 104 of FIGS. 1A, 2, and 6, the actuator 216 of FIG. 2, the image processor 108 of FIGS. 1A and 6, the first image processor 210 of FIG. 2, one or more other devices, modules, or any combination thereof.

The apparatus may also include means for determining a second region of interest in the scene captured by a second camera. The second region of interest may be determined based on the first region of interest. For example, the means for determining the second region of interest may include the image processor 108 of FIGS. 1A and 6, the second image processor 220 of FIG. 2, one or more other devices, modules, or any combination thereof.

The apparatus may also include means for performing a second autofocus operation on the second region of interest. For example, the means for performing the second autofocus operation may include the second camera 106 of FIGS. 1A, 2, and 6, the actuator 226 of FIG. 2, the image processor 108 of FIGS. 1A and 6, the second image processor 220 of FIG. 2, one or more other devices, modules, or any combination thereof.

The apparatus may also include means for fusing a first image of the scene captured by the first camera with a second image of the scene captured by the second camera to generate a fused image. The first image may be based on the first autofocus operation, and the second image may be based on the second autofocus operation. For example, the means for fusing the first image with the second image may include the image processor 108 of FIGS. 1A and 6, the first image processor 210 of FIG. 2, the second image processor 220 of FIG. 2, one or more other devices, modules, or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as RAM, MRAM, STT-MRAM, flash memory, ROM, PROM, EPROM, EEPROM, registers, hard disk, a removable disk, or a CD-ROM. An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of performing an image autofocus operation using multiple cameras, the method comprising:
   performing, at an image processor, a first autofocus operation on a first region of interest in a scene captured by a first camera, the first autofocus operation performed in response to a determination that a dynamic computation of a region of interest shift from a second camera to the first camera is unsuccessful, and the first autofocus operation comprising adjusting a focus of the first camera based on a distance between the first camera and an object within the first region of interest;
   determining a second region of interest in the scene captured by the second camera, the second region of interest determined based on the distance and the first region of interest;
   performing a second autofocus operation on the second region of interest; and
   fusing a first image of the scene captured by the first camera with a second image of the scene captured by the second camera to generate a fused image, wherein the first image is based on the first autofocus operation, and wherein the second image is based on the second autofocus operation.

2. The method of claim 1, wherein determining the second region of interest comprises:
   identifying first key-points in the first region of interest; and
   matching the first key-points to second key-points associated with a field of view of the second camera, wherein the second region of interest comprises the second key-points.

3. The method of claim 2, further comprising:
   identifying a particular key-point of the second key-points in an initial region of interest in the scene captured by the second camera;
   comparing a location of the particular key-point to a location of a corresponding key-point of the first key-points; and
   modifying the initial region of interest based on the comparison to generate the second region of interest.

4. The method of claim 3, wherein modifying the initial region of interest comprises shifting the initial region of interest.

5. The method of claim 3, wherein modifying the initial region of interest comprises scaling the initial region of interest.

6. The method of claim 1, further comprising rectifying the second camera using stereo calibration to align the second camera with the first camera.

7. The method of claim 1, wherein performing the first autofocus operation comprises:
   generating first autofocus statistics for a first lens position of the first camera;
   generating second autofocus statistics for a second lens position of the first camera;
   comparing the first autofocus statistics to the second autofocus statistics; and
   moving a lens of the first camera to the first lens position or to the second lens position based on the comparison.

8. The method of claim 1, wherein performing the second autofocus operation comprises:
   generating third autofocus statistics for a third lens position of the second camera;
   generating fourth autofocus statistics for a fourth lens position of the second camera;
   comparing the third autofocus statistics to the fourth autofocus statistics; and
   moving a lens of the second camera to the third lens position or to the fourth lens position based on the comparison.

9. The method of claim 1, further comprising:
   determining a first lens position of the first camera during the first autofocus operation, the first lens position used to capture the first image; and
   determining a second lens position of the second camera during the second autofocus operation, the second lens position used to capture the second image.

10. An apparatus comprising:
    an image processor; and
    a memory storing instructions executable to cause the image processor to perform operations comprising:
       performing a first autofocus operation on a first region of interest in a scene captured by a first camera, the first autofocus operation performed in response to a determination that a dynamic computation of a region of interest shift from a second camera to the first camera is unsuccessful, and the first autofocus operation comprising adjusting a focus of the first camera based on a distance between the first camera and an object within the first region of interest;
       determining a second region of interest in the scene captured by the second camera, the second region of interest determined based on the distance and the first region of interest;
       performing a second autofocus operation on the second region of interest; and
       fusing a first image of the scene captured by the first camera with a second image of the scene captured by the second camera to generate a fused image, wherein the first image is based on the first autofocus operation, and wherein the second image is based on the second autofocus operation.

11. The apparatus of claim 10, wherein determining the second region of interest comprises:
    identifying first key-points in the first region of interest; and
    matching the first key-points to second key-points associated with a field of view of the second camera, wherein the second region of interest comprises the second key-points.

12. The apparatus of claim 11, wherein the operations further comprise:

identifying a particular key-point of the second key-points in an initial region of interest in the scene captured by the second camera;
comparing a location of the particular key-point to a location of a corresponding key-point of the first key-points; and
modifying the initial region of interest based on the comparison to generate the second region of interest.

13. The apparatus of claim 12, wherein modifying the initial region of interest comprises shifting the initial region of interest.

14. The apparatus of claim 10, wherein the operations further comprise rectifying the second camera using stereo calibration to align the second camera with the first camera.

15. The apparatus of claim 10, wherein performing the first autofocus operation comprises:
generating first autofocus statistics for a first lens position of the first camera;
generating second autofocus statistics for a second lens position of the first camera;
comparing the first autofocus statistics to the second autofocus statistics; and
moving a lens of the first camera to the first lens position or to the second lens position based on the comparison.

16. The apparatus of claim 10, wherein performing the second autofocus operation comprises:
generating third autofocus statistics for a third lens position of the second camera;
generating fourth autofocus statistics for a fourth lens position of the second camera;
comparing the third autofocus statistics to the fourth autofocus statistics; and
moving a lens of the second camera to the third lens position or to the fourth lens position based on the comparison.

17. A non-transitory computer-readable medium comprising instructions for performing an image autofocus operation using multiple cameras, the instructions, when executed by an image processor, cause the image processor to perform operations comprising:
performing a first autofocus operation on a first region of interest in a scene captured by a first camera, the first autofocus operation performed in response to a determination that a dynamic computation of a region of interest shift from a second camera to the first camera is unsuccessful, and the first autofocus operation comprising adjusting a focus of the first camera based on a distance between the first camera and an object within the first region of interest;
determining a second region of interest in the scene captured by the second camera, the second region of interest determined based on the distance and the first region of interest;
performing a second autofocus operation on the second region of interest; and
fusing a first image of the scene captured by the first camera with a second image of the scene captured by the second camera to generate a fused image, wherein the first image is based on the first autofocus operation, and wherein the second image is based on the second autofocus operation.

18. The non-transitory computer-readable medium of claim 17, wherein determining the second region of interest comprises:
identifying first key-points in the first region of interest; and
matching the first key-points to second key-points associated with a field of view of the second camera, wherein the second region of interest comprises the second key-points.

19. The non-transitory computer-readable medium of claim 18, wherein the operations further comprise:
identifying a particular key-point of the second key-points in an initial region of interest in the scene captured by the second camera;
comparing a location of the particular key-point to a location of a corresponding key-point of the first key-points; and
modifying the initial region of interest based on the comparison to generate the second region of interest.

20. The non-transitory computer-readable medium of claim 19, wherein modifying the initial region of interest comprises shifting the initial region of interest.

21. The non-transitory computer-readable medium of claim 19, wherein modifying the initial region of interest comprises scaling the initial region of interest.

22. The non-transitory computer-readable medium of claim 17, wherein the operations further comprise rectifying the second camera using stereo calibration to align the second camera with the first camera.

23. The non-transitory computer-readable medium of claim 17, wherein performing the first autofocus operation comprises:
generating first autofocus statistics for a first lens position of the first camera;
generating second autofocus statistics for a second lens position of the first camera;
comparing the first autofocus statistics to the second autofocus statistics; and
moving a lens of the first camera to the first lens position or to the second lens position based on the comparison.

24. The non-transitory computer-readable medium of claim 17, wherein performing the second autofocus operation comprises:
generating third autofocus statistics for a third lens position of the second camera;
generating fourth autofocus statistics for a fourth lens position of the second camera;
comparing the third autofocus statistics to the fourth autofocus statistics; and
moving a lens of the second camera to the third lens position or to the fourth lens position based on the comparison.

25. An apparatus comprising:
means for performing a first autofocus operation on a first region of interest in a scene captured by a first camera, the first autofocus operation performed in response to a determination that a dynamic computation of a region of interest shift from a second camera to the first camera is unsuccessful, and the first autofocus operation comprising adjusting a focus of the first camera based on a distance between the first camera and an object within the first region of interest;
means for determining a second region of interest in the scene captured by the second camera, the second region of interest determined based on the distance and the first region of interest;
means for performing a second autofocus operation on the second region of interest; and
means for fusing a first image of the scene captured by the first camera with a second image of the scene captured by the second camera to generate a fused image, wherein the first image is based on the first autofocus operation, and wherein the second image is based on the second autofocus operation.

26. The apparatus of claim 25, wherein the means for determining the second region of interest comprises:
   means for identifying first key-points in the first region of interest; and
   means for matching the first key-points to second key-points associated with a field of view of the second camera, wherein the second region of interest comprises the second key-points.

27. The apparatus of claim 26, further comprising:
   means for identifying a particular key-point of the second key-points in an initial region of interest in the scene captured by the second camera;
   means for comparing a location of the particular key-point to a location of a corresponding key-point of the first key-points; and
   means for modifying the initial region of interest based on the comparison to generate the second region of interest.

28. The apparatus of claim 27, wherein the means for modifying the initial region of interest comprises means for shifting the initial region of interest.

29. The apparatus of claim 27, wherein the means for modifying the initial region of interest comprises means for scaling the initial region of interest.

30. The method of claim 1, wherein the dynamic computation of the region of interest shift is unsuccessful if the image processor fails to compute a shift between the first region of interest and a region of interest that corresponds to the second region of interest.

* * * * *